C. E. WHITE.
ALFALFA CULTIVATOR.
APPLICATION FILED MAY 10, 1911.
1,290,446.
Patented Jan. 7, 1919.
5 SHEETS—SHEET 2.
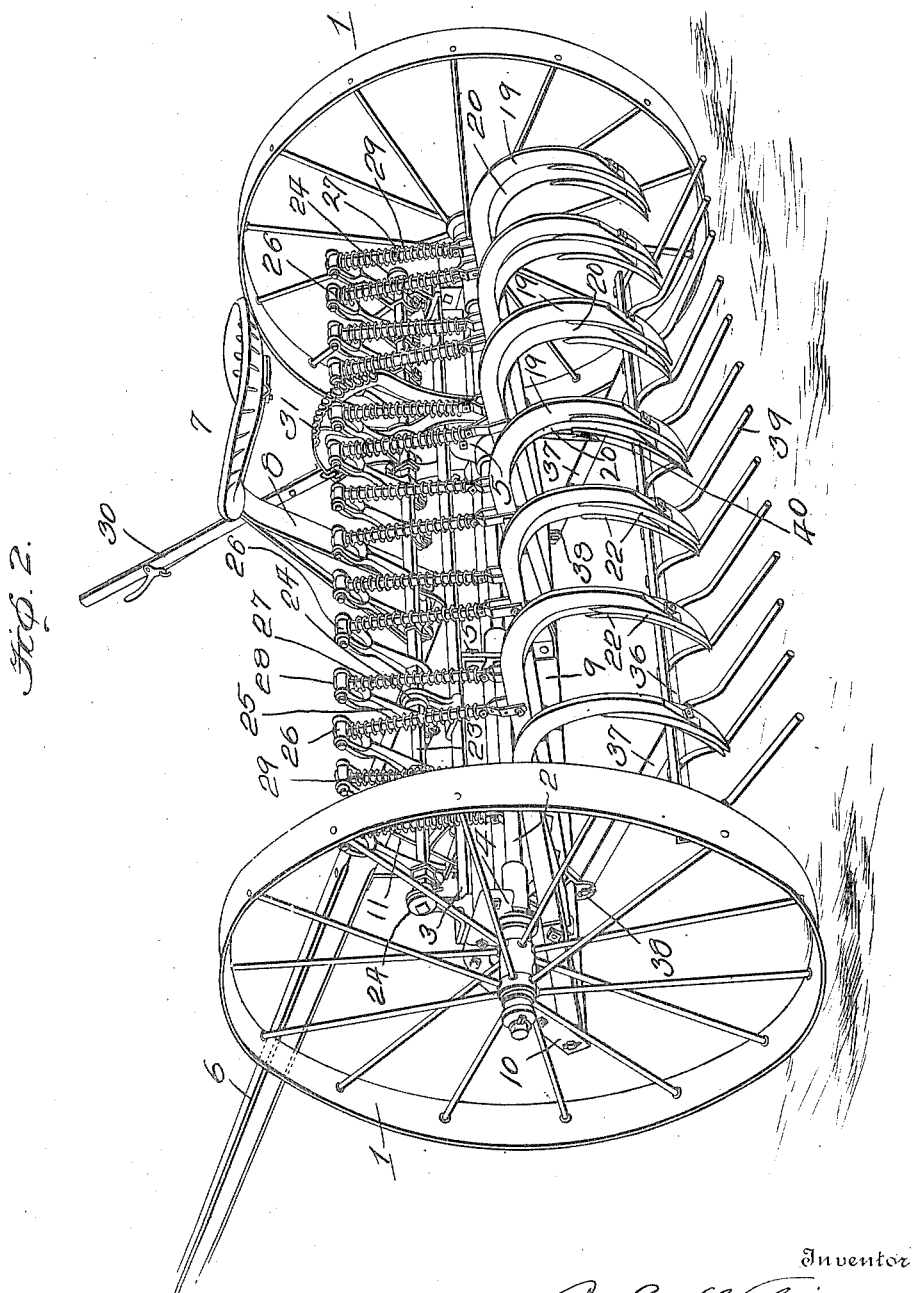

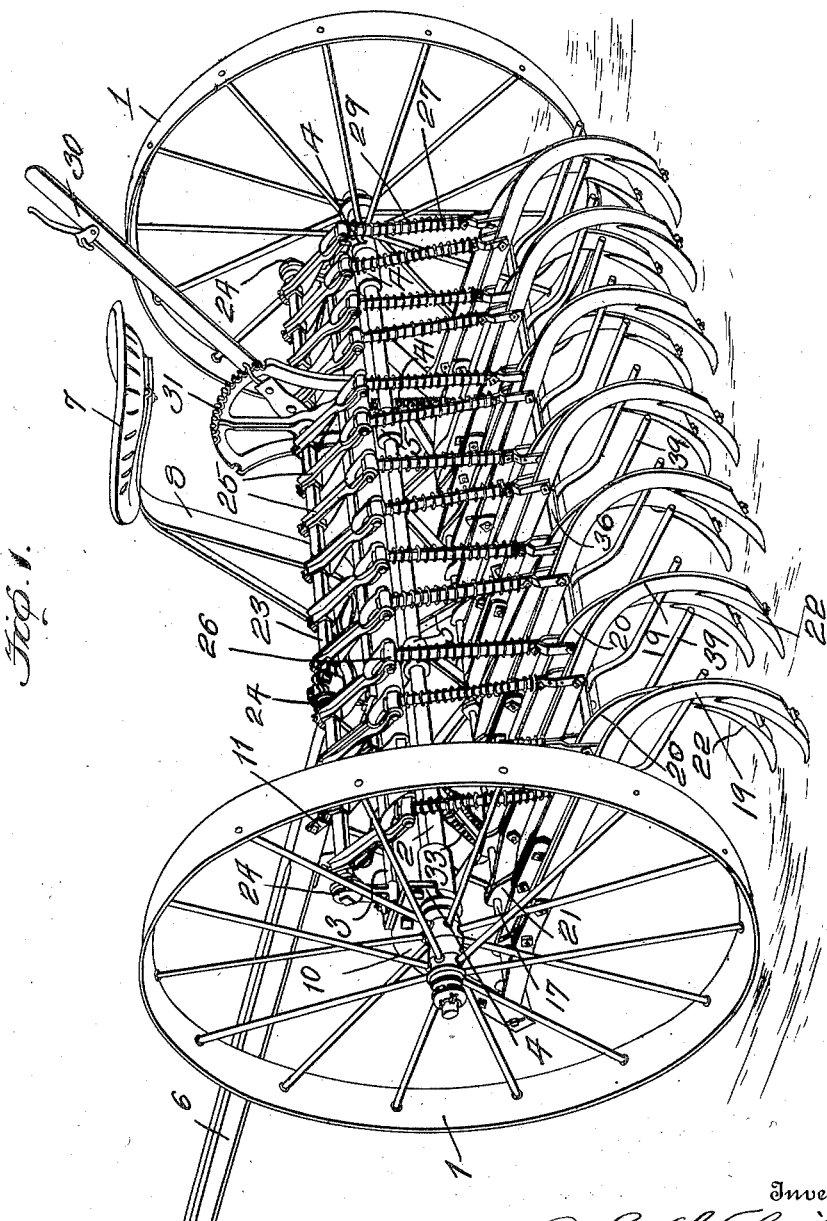

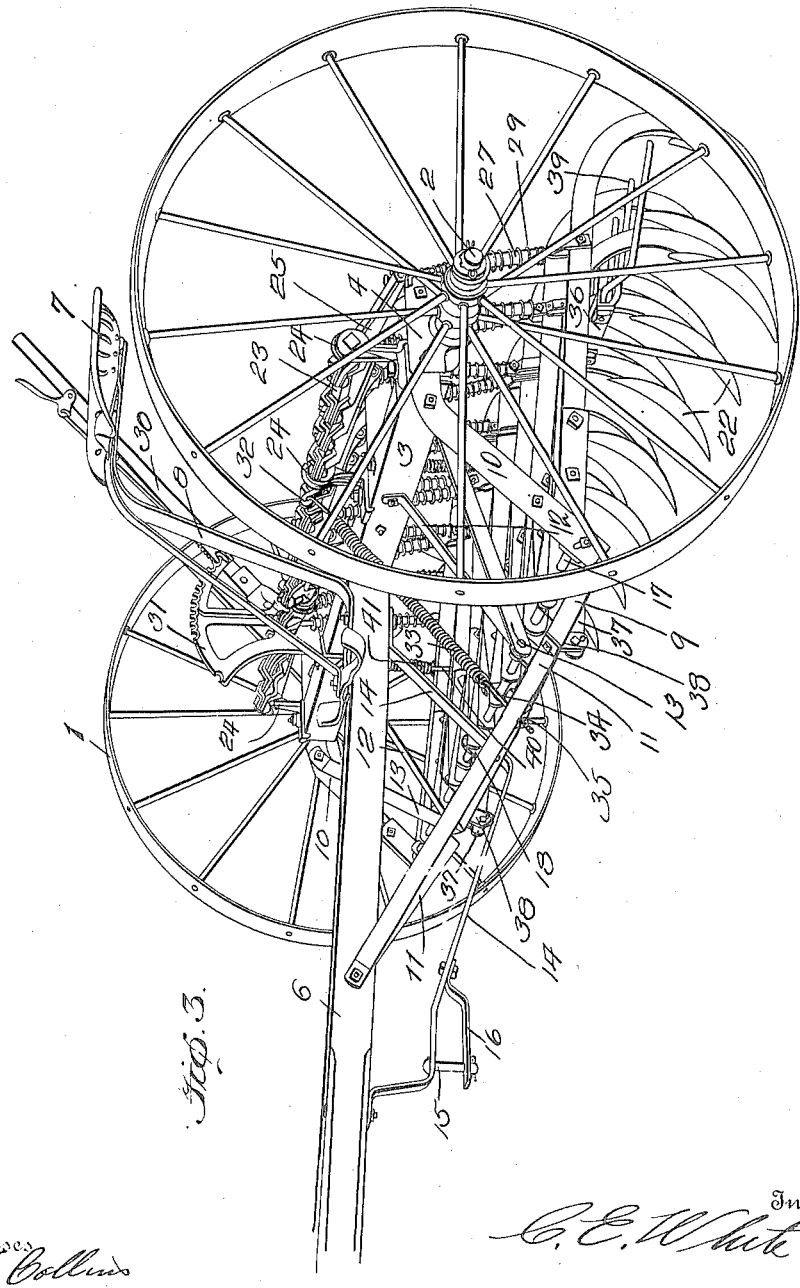

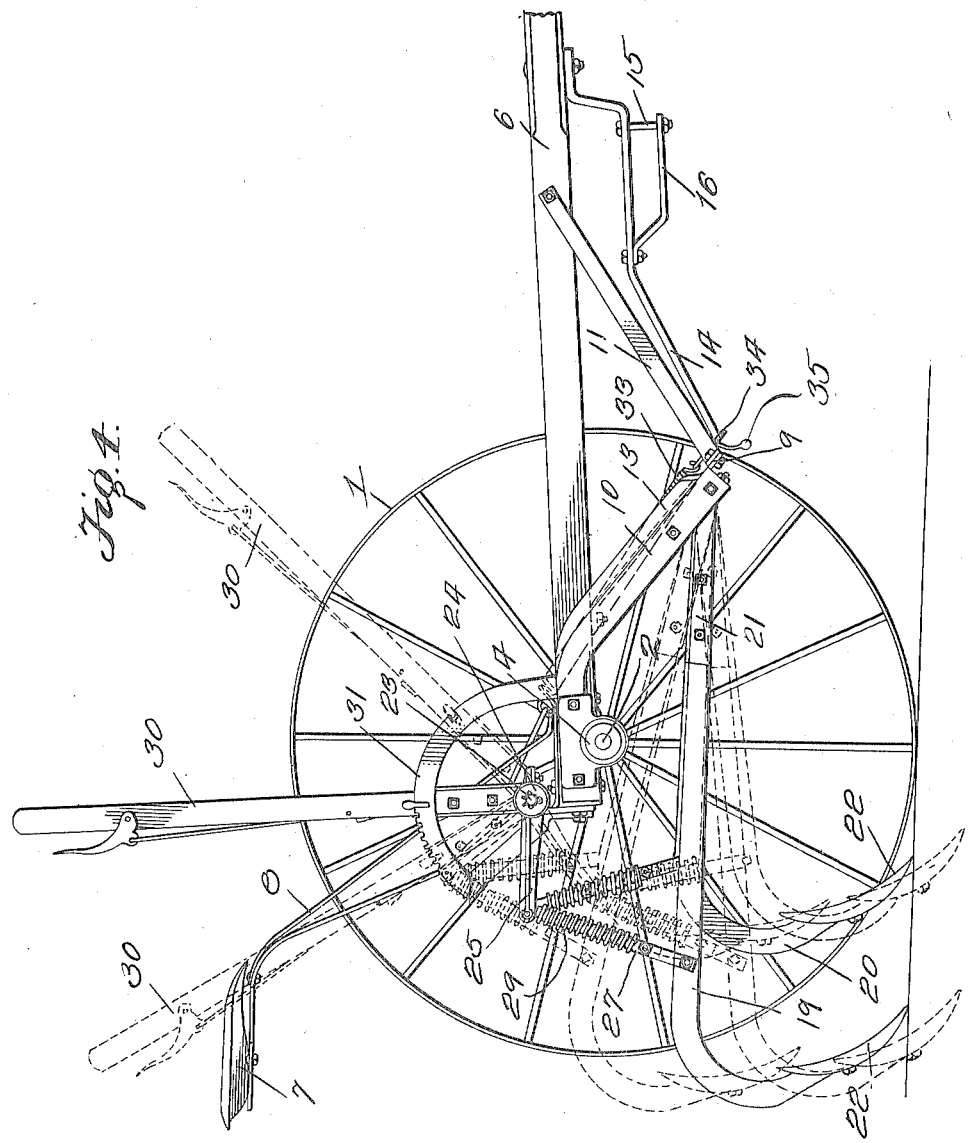

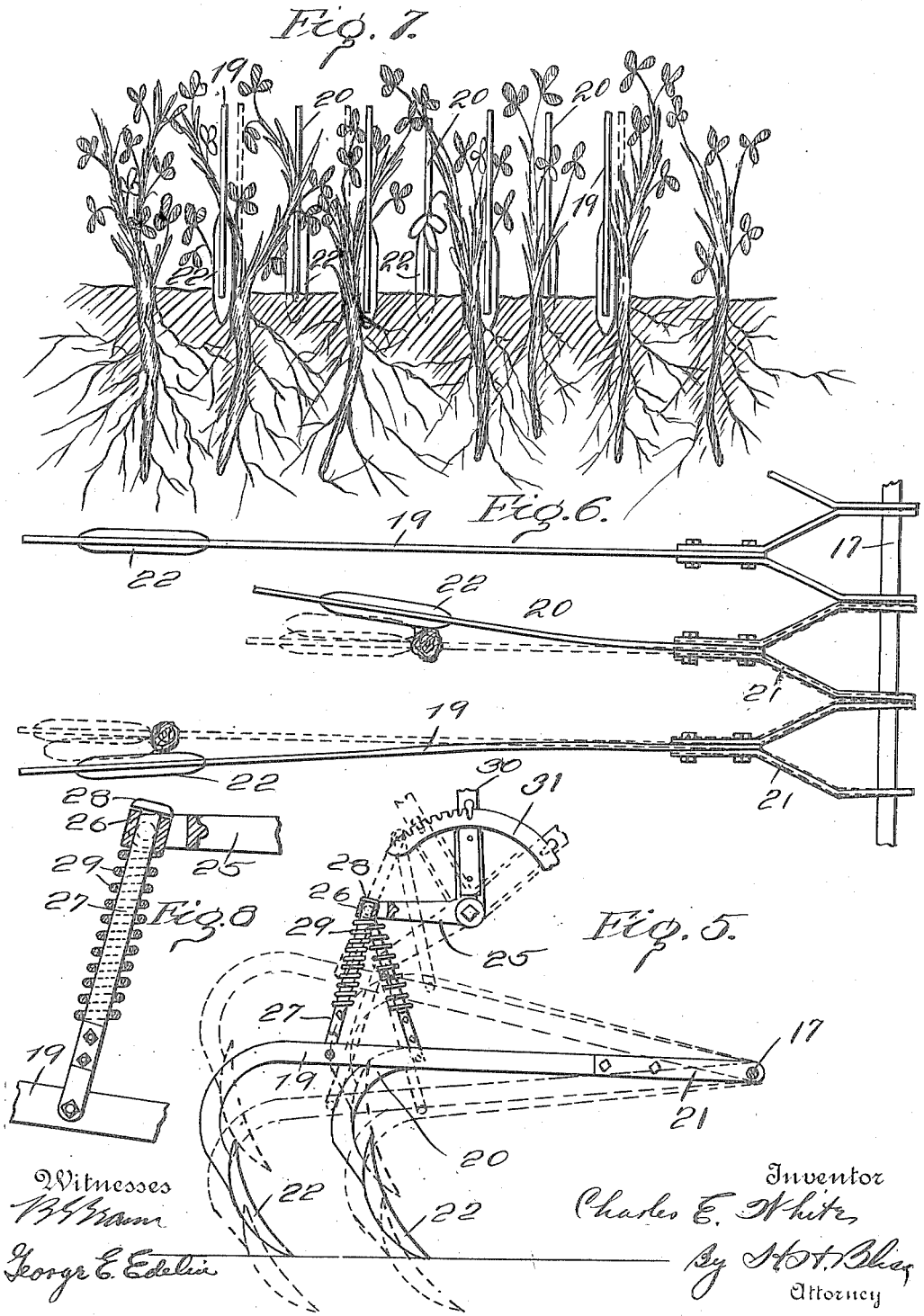

UNITED STATES PATENT OFFICE.

CHARLES E. WHITE, OF MOLINE, ILLINOIS, ASSIGNOR TO DEERE & MANSUR COMPANY, A CORPORATION OF ILLINOIS.

ALFALFA-CULTIVATOR.

1,290,446.　　　　　Specification of Letters Patent.　　Patented Jan. 7, 1919.

Application filed May 10, 1911. Serial No. 626,227.

*To all whom it may concern:*

Be it known that I, CHARLES E. WHITE, a citizen of the United States, residing at Moline, in the county of Rock Island and State of Illinois, have invented certain new and useful Improvements in Alfalfa-Cultivators, of which the following is a specification, reference being had therein to the accompanying drawing.

This invention relates to improvements in cultivators of the type especially intended and adapted for the "renovation" of alfalfa.

One of the objects of the invention is to provide improved means for controlling the movement of the teeth. Other objects will be apparent from the following specification.

Of the drawings,

Figure 1 is a perspective view taken from the rear and showing the teeth in operative positions.

Fig. 2 is a view similar to Fig. 1 but showing the teeth in elevated positions.

Fig. 3 is a perspective view taken from the front.

Fig. 4 is a side elevation with the extreme positions of the teeth shown by dotted lines.

Fig. 5 is a diagrammatic view showing the teeth and associated parts detached from the machine and adjusted to various positions.

Fig. 6 is a diagrammatic plan view showing the action of the teeth when in engagement with alfalfa roots.

Fig. 7 is a fragmentary rear end view of the machine in operation in an alfalfa field, the ground being shown in cross section.

Fig. 8 is an enlarged fragmentary cross-sectional view of one of the connections for controlling the tooth bars.

Referring to the drawings, 1, 1 represent the two main supporting wheels which are connected to the main axle 2. 3 is a main transverse frame bar preferably formed of a single angle iron. This bar 3 is connected at its ends to bearings 4, 4, which are mounted upon the axle 2 near its ends. The bar 3 is provided with other bearings 5, 5, also mounted upon the shaft 2.

6 represents the draft tongue which is secured at its rear end to the cross bar 3. The seat 7 is mounted upon the rear end of the tongue by means of a suitable support 8.

9 represents the cross bar of a sub-frame. This cross bar is connected at its ends to the braces 10, 10, which extend upward and backward and are connected to the ends of the cross bar 3. Forward extending braces 11, 11 are provided between the bar 9 and the tongue. Other braces 12, 12, and 13, 13 are provided between the cross bar 9 and the cross bar 3, and between the cross bar 9 and the end braces 10, 10. At the center of the machine is a bar or brace 14, which extends downward and forward from the rear end of the tongue and is secured intermediate its ends to the cross bar 9 near its center. The forward end of this bar 14 is carried forward and upward and is secured to the tongue. A king bolt 15 and a hammer strap 16 are secured to the bar 14 for the attachment of a whiffletree.

17 is a cross pivot shaft secured to the sub-frame of the machine parallel to the cross bar 9. The ends of this shaft are mounted on the braces 10, 10, and the brackets 18 are provided for supporting the shaft intermediate its ends. 19, 19 and 20, 20 represent two series of tooth bars, the bars of one series being alternately arranged relative to those of the other. At the forward end of each of the bars there are provided two separated forks which may be formed by bolting on separate pieces 21, 21. These forks are mounted on the pivot bars 17 by means of suitable pivot apertures. The forks are spread sufficiently so that the adjacent forks of adjacent bars engage each other to hold the bars in proper spaced relation.

The bars 19, 19 and 20, 20 are curved downward at their rear ends and carry the rounded teeth 22, 22. Each of these teeth 22 is concave toward the rear in vertical longitudinal planes, and is convex toward the front in horizontal planes. Each tooth is pointed at the bottom and at the top so that it may be reversed when one end has become worn. It will be observed that the bars 19, 19 are longer than the bars 20, 20 with the result that the teeth 22, 22 are held in staggered relation to each other in two separate transverse rows.

23 is a rock shaft mounted on the frame bar 3 by means of bearings 24, 24. 25, 25 are levers connected at their forward ends to the shaft 23 with a transverse spacing similar to that of the bars 19, 19 and 20, 20. The rear ends of the levers 25, 25 are forked and between the forks of each lever there is pivotally mounted a yoke 26. The yokes 26, 26 are provided with central apertures and through these apertures extend the rods 27, 27, each of which is provided with a head 28 at its upper end. The lower end of each of the bars 27 is pivotally connected to the rear part of one of the bars 19, 19 or 20, 20. Coil springs 29, 29 surround the bars 27, 27, and engage at their upper ends with the yokes 26, 26.

30 is a controlling lever secured to the rock shaft 23. 31 is a notched segment adapted to be engaged by a latch controlled detent on the lever 30 for locking the rock shaft 23 in adjusted position.

32 is an arm on the rock shaft extending in the reverse direction from the levers 25, 25. To the forward end of this arm 32 is connected the tension coil spring 33, the forward end of which is connected to the cross bar 9 by means of a threaded rod 34 and a nut 35.

As is most clearly shown in Fig. 4, the points of connection between the bars 27 and the tooth bars 19 are farther toward the rear than are the points of connection between the bars 27 and the tooth bars 20. For any given movement of the rock shaft 23, the upper ends of all of the bars 27 will be moved the same amount. It is, however, desirable that all of the teeth 22 be moved through the same vertical distance. On account of the different lengths of the bars 19, 19 and 20, 20, this similarity of vertical movement would not be obtained if the bars were all connected to move through the same angle. However, by connecting the bars 27, 27 to the shorter bars 20, 20 at points nearer their pivots, I obtain a substantially uniform vertical movement of all of the teeth.

36 is a transverse cleaner frame bar which is connected to forward extending bars 37, 37. These forward bars are pivotally mounted on brackets 38, 38 which depend from the forward transverse bar 9. Cleaner fingers 39, 39 extend rearward from the bar 36. These fingers 39, 39 are so spaced that each of them extends between a pair of teeth. The cleaner frame is supported by means of links 40, 40 which are connected at their lower ends to the bars 37, 37, and which at their upper ends extend through the top flange of the angle bar 3. The upper ends of the links 40, 40 are held by means of cotter pins. Coil springs 41, 41 surrounding the links 40 are secured at their lower ends to the links and at their upper ends engage with the under surface of the top flange of the bar 3. These connections for the cleaner frame serve to limit its downward movement and to resiliently hold it against upward movement.

In operation, the teeth are adjusted to the desired working depth by means of the hand lever 30. They are resiliently held at this depth by means of the springs 29 but are free to move against the action of the springs in case unusual obstructions are met with. It will be understood that as the teeth rise against the influence of the springs, the rods 27, 27 slide freely in the yokes 26, 26. When it is desired to lift the teeth out of operative positions, the hand lever 30 is thrown forward and the parts are moved to the positions shown in Fig. 2 and by the upper dotted lines of Fig. 4. As the teeth move upward past the cleaner fingers 39, any fibrous material that may have accumulated on them is removed.

By examining Fig. 6 it will be seen that there is no cutting or piercing edge element of the tooth when consideration is given to the lines of forward travel and to the points on the roots of the plants where cutting or piercing would be effected. In this respect the teeth differ from the corresponding parts in ordinary cultivators. In the latter the teeth are mainly and primarily for the purpose of cutting, laterally, or piercing, longitudinally, the roots of weeds, grasses, or the like, there being no intention that they shall even contact with the roots of the plants that are to be cultivated, and distinct provision being made that such contact shall be avoided.

In my mechanism the contact of the tooth element with the roots or stalks of the plant is not wholly unavoidable, but is intended. To meet such purposes it is of peculiar shape, and, as before stated, there is no penetrating point element and no lateral cutting part. While the very foremost projecting part may be referred to as "sharp", it is only properly so described when compared with the wide edged earth-working tools. In comparison with the points of ordinary cultivator teeth, it is, as shown in Fig. 6, rounded so that it will not penetrate any root or stalk which it impinges upon. And the side edges diverging backward from the point, or foremost, part, are carried back so that they do not cut, and a smooth surfaced part, at the front, comes into contact with the alfalfa, or other, roots.

This is true of both end parts of the tooth element; and the intervening or central part, longitudinally, has its edges correspondingly turned backward so as to avoid any cutting of the roots. Contact of this part of the tool with the alfalfa stalks or roots is desirable in order that the bark or dead surface portion of the plant can be removed and the living skin portion exposed, this renewing and maintaining the growth of the plant.

The grasses, weeds and other foreign plants that are impinged on by the teeth are pulled out of the ground, their roots having much less hold upon it than the roots or stalks of the alfalfa.

By examining Fig. 6 and the other drawings it will be seen that if a cross section, in a plane at right angles to the length lines of the tooth, be taken, that both surfaces of the tooth are on short, approximately circular, curves, that is, upon curves described upon very short radii; and that the tooth elements proper are fitted tightly around the narrow, downwardly extended parts of the draw bar shanks, so that the teeth are each very narrow and relatively arranged as above described, so that they present to all lines of advance of the machine smooth surfaces or edges which, as above set forth, do not act to pierce or cut the alfalfa roots.

It will be further understood that this, of itself, is intimately related with the devices which mount, and support, and permit, the yielding of these teeth. As they cannot pierce or cut, they are necessarily pressed laterally, and to permit this in such way as to avoid evil results to the plants they are mounted in the way described.

One of the purposes of the present devices is to avoid the forming of wide furrows in the earth or to displace it to any material extent; hence, the tools are not wide or shovel-like, or flat, as has been common. As remarked, they are limited in width as much as possible and rounded so that instead of displacing the earth they leave it largely in its initial condition after stirring it and tearing up the shallow-rooted weeds, grass, or the like.

I am aware that in cultivator implements as heretofore made use has been made of shovels arranged in two transverse rows carried by drag bars which are held in position rigidly both as to their downward and their upward movements; they being placed in two transverse rows for the purpose of preventing the banking up of the earth such as would occur if they were all placed close together and on one transverse line. I arrange the rounded teeth of my construction in two transverse rows which are a considerable distance apart. Those of each row are respectively carried by long drag bars, though the bars of the front row are considerably shorter than those of the rear row. The bars of each row are adapted, as above described, to vibrate laterally in either direction so that each tooth, individually, if it should commence to impinge upon an alfalfa root or stalk, can swing to the right or the left sufficiently to allow the tooth to escape from the plant.

By having the teeth arranged, thus, in two rows, free spaces are provided in both rows to allow the stalks or vertical roots to pass between the teeth and prevent them from being seriously cut or marred.

I am also aware of the fact that shovel cultivator machines have been heretofore used in which wide blades were carried by drag bars that were pressed in one direction by springs. But, as already noted, the drag bars in my construction are more or less free to swing in either direction so as to pass around any roots with which they may contact, although normally held to a predetermined line, and this play to the right or the left may be provided in any devices now known to the builders of such machines.

What I claim is:—

1. In a cultivator, the combination with a frame, of two series of parallel tooth bars pivotally connected at their forward ends to the frame along one transverse line, the bars of one series being longer than those of the other and arranged alternately relatively thereto, soil working teeth at the rear ends of the bars, links of uniform length for all the bars, and connected one to each bar, the connections for the shorter bars being closer to the points of pivotal connection than those for the longer bars, said bars being adapted to hold the teeth normally in predetermined working positions but to yield laterally in either direction to permit the teeth to pass around stalks or roots, manually controllable means simultaneously engaging all of the links to limit their downward movement or to move them upward through substantially equal distances, and a spring for each link for yieldingly holding the bars at their lowermost limits.

2. In an alfalfa cultivator, the combination of a wheeled frame, a transverse series of parallel working units, each unit having a bracing hinge element to engage with a front frame pivot, a drag bar element rigidly secured to the hinge element and shaped to have an integral downwardly bent lower end, and a tooth rigidly secured to said lower end, the tooth the drag bar and the hinge element being automatically vibratable vertically as an integer rigid from end to end around the front hinge axis independently of the other working units and adapted to permit the tooth to be deflected laterally in either direction independently of the other teeth and to automatically return the tooth in either direction to normal working line after deflection, said tooth being transversely narrow and having its edge portions turned backward to non-cutting positions, yielding means for holding down each working unit but permitting it to rise indefinitely independently of the other units, and means for manually and positively lifting all of the working units simultaneously.

3. In an alfalfa cultivator, the combination with the wheeled frame, of a transverse series of parallel tooth bars hinged at their forward ends to the frame by pivot attachments and bent downward at their rear ends, the said bars and their attachments respectively being adapted to permit the rear end of each bar to be independently automatically and relatively easily deflected laterally in either direction out of predetermined normal position and to independently return said rear ends respectively in either direction to said normal positions, and soil-working and plant-engaging teeth connected to said bars respectively at their rear ends, each tooth being transversely narrow and having its front lower side edge portions turned backward to bring the edges to a non-cutting position and the extreme part being shaped to impinge upon but not penetrate or cut the roots being cultivated.

4. In an alfalfa cultivator, the combination with a wheeled frame having a transversely arranged pivot rod, of a transverse series of parallel tooth bars hinged at their forward ends on the said pivot rod and each bent downward at its rear end, the said bars and their attachments being respectively adapted to permit the rear end of each bar to be independently automatically and relatively easily deflected laterally in either direction out of predetermined normal working position and to independently return said rear ends respectively in either direction to said normal position, a series of vibratable bar-lifting arms arranged in a transverse series one above each tooth bar, a series of links each pivoted to the rear part of a tooth bar and slidably joined by a rocking connection to one of said lifting arms, means for locking said lifting arms in predetermined positions, a spring interposed between each of the lifting arms and its tooth bar, and teeth substantially as described rigidly secured to the rear ends of the tooth bars, all of said parts being arranged as set forth to permit each tooth to rise upwardly independently of the others around the said front pivot and against the action of its spring, and means for moving all of said lifting arms simultaneously to uniformly elevate all of the teeth.

5. In an alfalfa cultivator, the combination of the wheeled frame, two transverse rows of teeth, each tooth being shaped substantially as set forth, to be transversely narrow and rounded and have its side edges turned backward to non-cutting positions whereby each is provided with a soil-entering part adapted to bear laterally against stalks or roots without cutting them, two series of drag bars, those of one series being longer than and alternating with the bars of the other series, each bar being turned downward at its rear end and connected to one of said teeth and having a relatively elongated forwardly-extending horizontal bar, and connecting devices joining the forward end of each bar to the frame adapted to permit the tooth and the rear end of the bar under relatively low predetermined lateral pressure to swing in vertical parallelism in either direction away from a normal central working position, and adapted to hold a tooth in said working position until the limit of said pressure is reached, and to return the tooth to said working position after said lateral swinging.

In testimony whereof I affix my signature, in presence of two witnesses.

CHARLES E. WHITE.

Witnesses:
OSCAR F. LUNDAHL,
ROBERT M. ADAMS.